United States Patent [19]
Tsurumaki

[11] Patent Number: 5,570,394
[45] Date of Patent: Oct. 29, 1996

[54] SIGNAL TRANSMISSION SYSTEM

[75] Inventor: Shinzo Tsurumaki, Kawasaki, Japan

[73] Assignee: Fujitsu Limited, Kanagawa, Japan

[21] Appl. No.: 288,541

[22] Filed: Aug. 8, 1994

[30] Foreign Application Priority Data

Jan. 11, 1994 [JP] Japan .................................. 6-001255

[51] Int. Cl.[6] .............................. H04L 27/06; H04B 17/00
[52] U.S. Cl. .......................... 375/340; 375/224; 375/282
[58] Field of Search ....................................... 375/259, 289, 375/309, 282, 295, 357, 316, 354, 340, 224; 340/825.06, 825.65, 826.69; 360/60; 341/70; 370/110.1

[56] References Cited

U.S. PATENT DOCUMENTS

| 4,665,518 | 5/1987 | Champlin et al. | 370/89 |
| 5,138,634 | 8/1992 | Knapp | 375/354 |
| 5,313,198 | 5/1994 | Hirao et al. | 340/825.69 |
| 5,383,066 | 1/1995 | Kim | 360/70 |

*Primary Examiner*—Tesfaudet Bocure

[57] ABSTRACT

A transmitter converts a change in a logical level of a signal to be transmitted, such as an alarm signal or a control signal, into a biphase signal. Upon receipt of the biphase signal, a receiver outputs a signal in which a previous value is maintained or only one of the logical levels occurs.

9 Claims, 17 Drawing Sheets

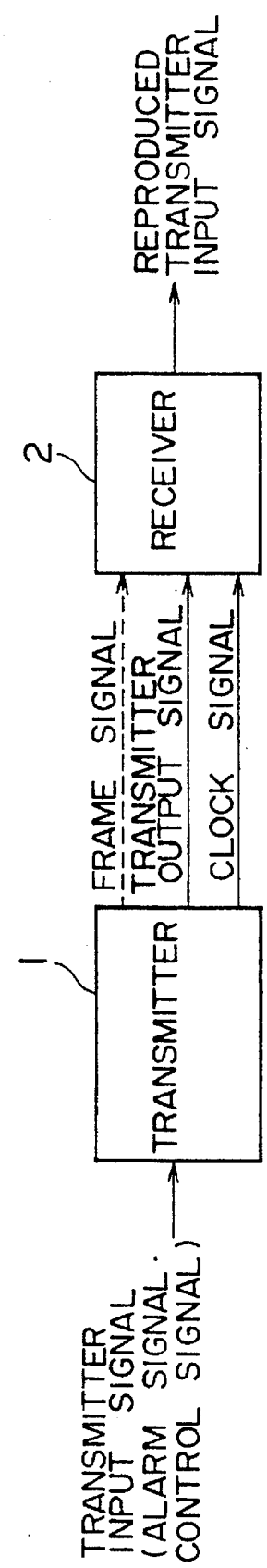

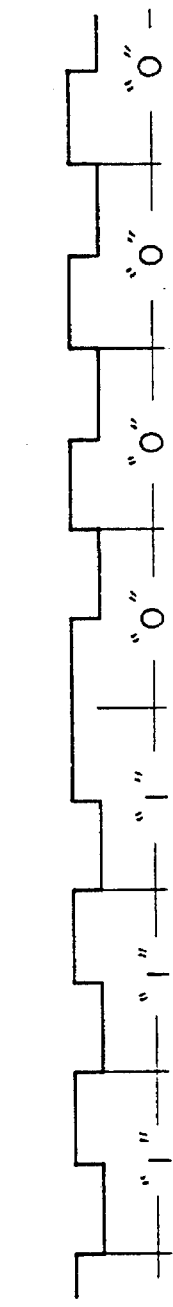
FIG.3A CLOCK SIGNAL
FIG.3B FRAME SIGNAL
FIG.3C BASIC SIGNAL
FIG.3D TRANSMITTER INPUT SIGNAL (ALARM SIGNAL / CONTROL SIGNAL) (ALARM)
FIG.3E SIGNAL (a) (NON-ALARM)
FIG.3F TRANSMITTER OUTPUT SIGNAL (ALARM SIGNAL / CONTROL SIGNAL)

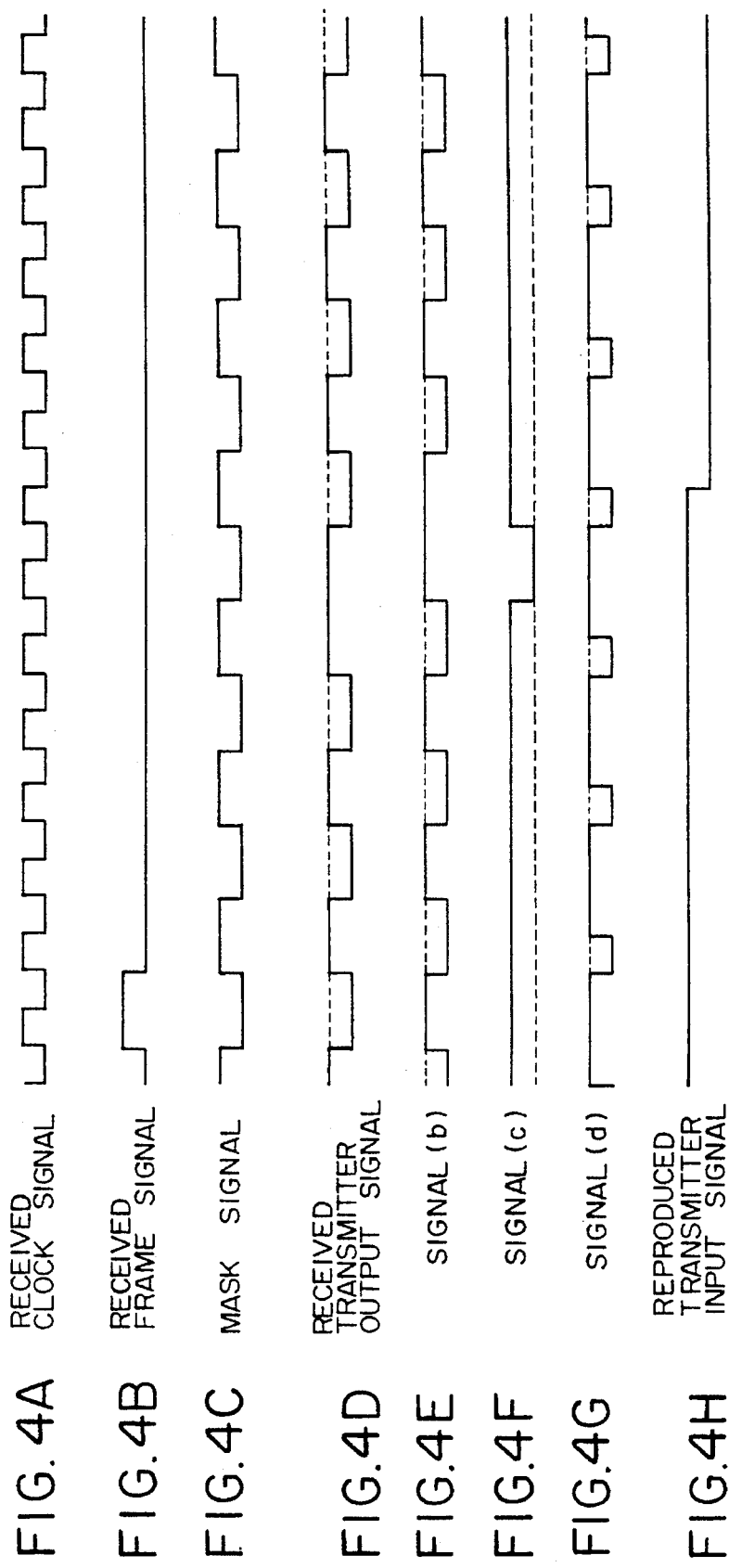

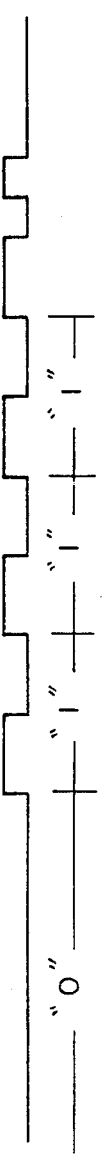
FIG.9A
FIG.9B
FIG.9C
CLOCK SIGNAL
TRANSMITTER INPUT SIGNAL
(ALARM SIGNAL / CONTROL SIGNAL)
TRANSMITTER OUTPUT SIGNAL
(ALARM SIGNAL / CONTROL SIGNAL)

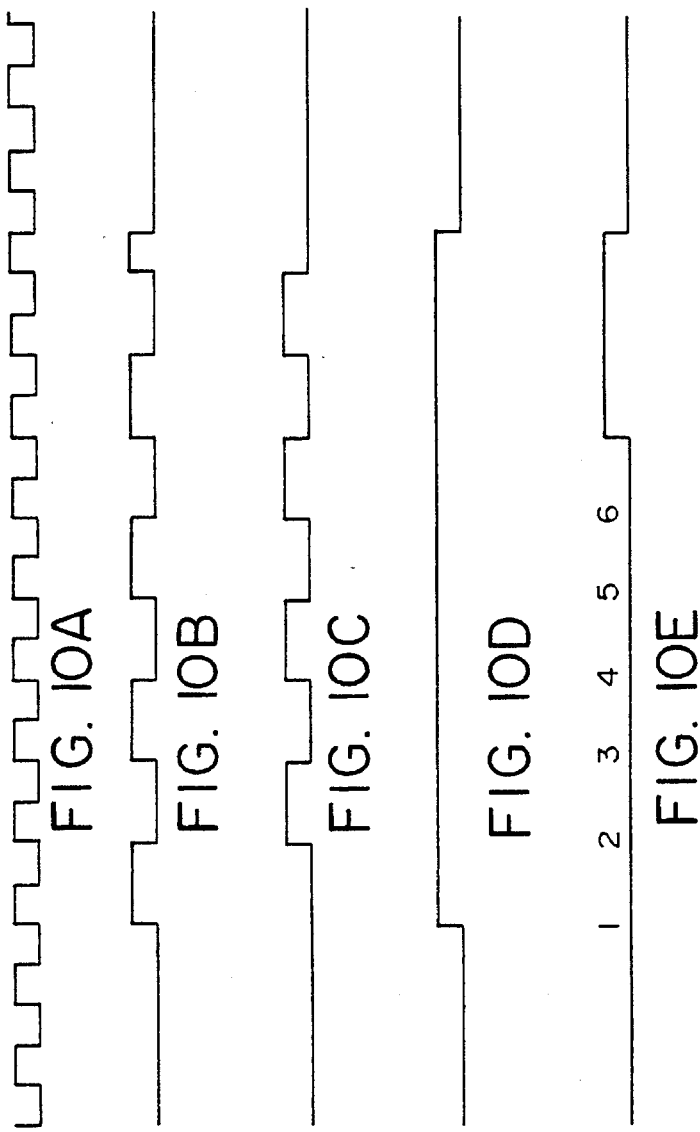

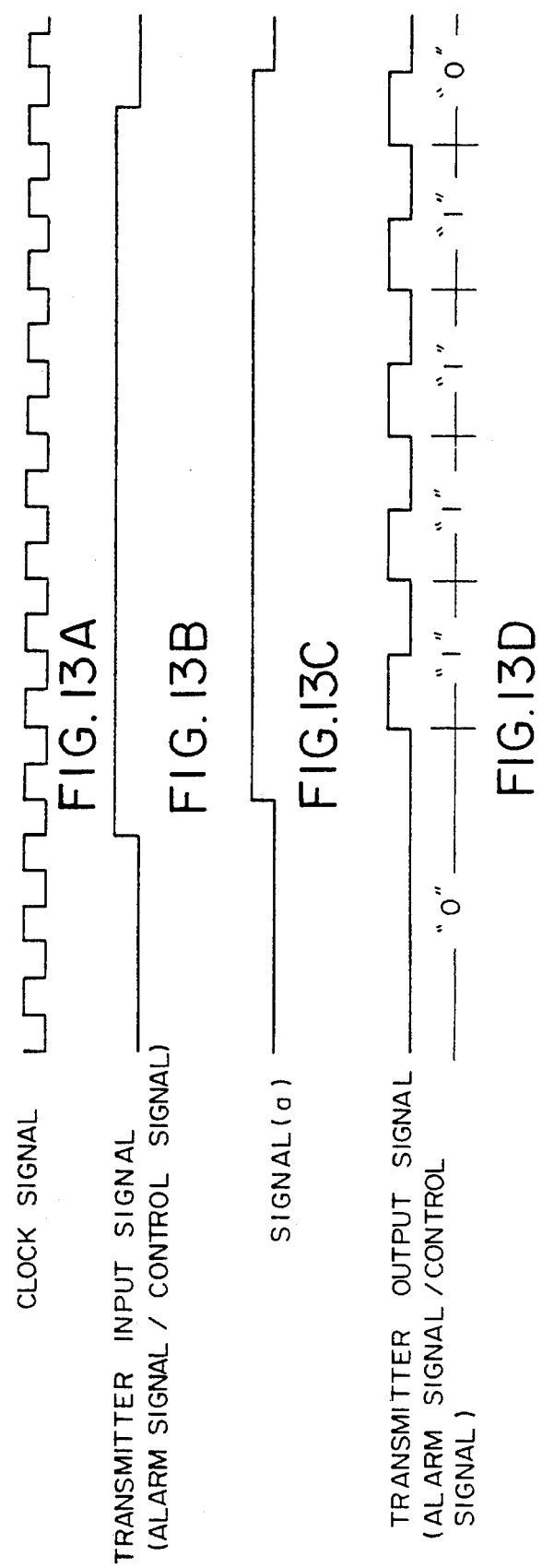

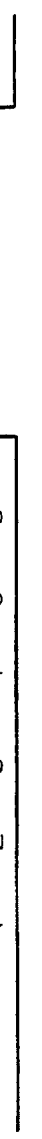
FIG. 14A  RECEIVED CLOCK SIGNAL
FIG. 14B  RECEIVED OUTPUT SIGNAL
FIG. 14C  SIGNAL (a)
FIG. 14D  SIGNAL (b)
FIG. 14E  REPRODUCED TRANSMITTER INPUT SIGNAL 5,570,394

SIGNAL TRANSMISSION SYSTEM

BACKGROUND OF THE INVENTION (1) Field of the Invention

The present invention relates to signal transmission systems and, more particularly, to a signal transmission system for transmitting an alarm signal or a control signal.

(2) Description of the Related Art

In a transmission system in a subscriber communications service in which system an analog telephone line, an ISDN line and a dedicated line coexist, a remote alarm signal for testing each line and a remote control signal need to be transmitted apart from a main signal.

FIG. 1 shows an example of conventional system for transmitting signals such as an alarm signal or a control signal from a transmitter 31 to a receiver 32. In such a conventional system, the transmitter 31 receives an alarm signal from an alarm source, or receives a control signal to a target of control, the signals being received as transmitter input signals. The transmitter 31 transmits these signals to the receiver 32 via a transmission channel 33.

Either the transmitter 31 forwards the transmitter input signals unmodified to the receiver 32, or the level of these signals is stabilized by means of a protection circuit formed by a pull-up resistance 34 or a capacitor 35 so as to prevent errors in the transmitted signals from occurring when a failure takes place in the transmitter 31 or the transmission channel 33.

In such a conventional system, it is difficult to prevent errors in the transmitter signals from occurring only by a protection circuit formed of a pull-up resistance or a capacitor. While such an arrangement will not present a problem when the information sent is not vulnerable to errors, the reliability of the transmission system will fall in the case of the information vulnerable to errors.

SUMMARY OF THE INVENTION

Accordingly, an object of the present invention is to provide a signal transmission system in which an error occurring in a transmitted signal is not generated in a receiver even when a failure occurs in a transmitter or a transmission channel.

Another and more specific object of the present invention is to provide a signal transmission system comprising: a transmitter which produces a basic signal on the basis of a clock signal and a frame signal, and produces a transmitter output signal having the format of a biphase logic signal that reflects a logical level change in a transmitter input signal, by reversing the basic signal in correspondence to logical reversal points of the transmitter input signal, the basic signal having a cycle of two clock pulses; and a receiver which receives the clock signal, the frame signal and the transmitter output signal, produces, on the basis of the clock signal and the frame signal, a mask signal that has a same cycle as the basic signal and masks a first one of a pair of clock pulses, detects biphase logical reversal points of the transmitter output signal on the basis of the clock signal and the mask signal by delaying the transmitter output signal by one cycle of the clock signal, and reproduces the transmitter input signal in which a previous logical level is maintained even when the transmitter output signal is locked in one logical value.

According to this aspect of the present invention, a previous logical level is maintained in the reproduced transmitter input signal and an error in the detection of the transmitter output signal can be prevented.

Still another object of the present invention is to provide signal transmission system comprising: a transmitter which produces a transmitter output signal having a predetermined pattern other than an all-zero pattern on the basis of a clock signal, said transmitter output signal being produced only during an enable state of a transmitter input signal; and a receiver which receives said clock signal and said transmitter output signal from said transmitter, detects an interval during which the predetermined pattern of said transmitter output signal occurs by means of said clock signal, counts the number of clock signal pulses occurring in the interval, and reproduces said transmitter input signal when the count exceeds a threshold value that indicates a normal state of said transmitter.

According to this aspect of the present invention, a reproduction of the transmitter input signal is prevented when the count does not reach "six", that is, when there is a failure in the transmitter.

Still another object of the present invention is to provide a signal transmission system comprising: a transmitter which produces a transmitter output signal having a predetermined pattern other than an all-zero pattern on the basis of a clock signal, said transmitter output signal being produced only during an enable state of a transmitter input signal; and a receiver which receives said clock signal and said transmitter output signal from said transmitter, detects an interval during which the predetermined pattern of said transmitter output signal occurs by means of said clock signal, counts the number of clock pulses occurring in a logical "1" pattern as well as in a logical "0" pattern, and reproduces said transmitter input signal when the count exceeds a threshold value that indicates a normal state of said transmitter.

According to this aspect of the present invention, the transmitter input signal is fixed to "0" when a failure occurs in a transmitter output signal, thereby ensuring that logical "1" of the transmitter input signal will not be output erroneously. Moreover, an erroneous occurrence of a pulse in a logical "0" position of the transmitter output signal is determined as a failure, whereupon the logical "1" is maintained.

BRIEF DESCRIPTION OF THE DRAWINGS

Other objects and further features of the present invention will be apparent from the following detailed description when read in conjunction with the accompanying drawings, in which:

FIG. 2 is a block diagram showing the principle and construction of the signal transmission system according to the present invention;

FIG. 3 is a time chart showing the operation of the transmitter of the signal transmission system according to a first embodiment;

FIG. 4 is a time chart showing the operation of the receiver of the signal transmission system according to the first embodiment;

FIG. 9 is a time chart showing the operation of the transmitter of the signal transmission system according to a second embodiment;

FIG. 10 is a time chart showing the operation of the receiver of the signal transmission system according to the second embodiment;

FIG. 13 is a time chart showing the operation of the receiver of the signal transmission system according to a fourth embodiment;

FIG. 14 is a circuit diagram showing an example of the transmitter of the signal transmission system according to the second embodiment;

DESCRIPTION OF THE PREFERRED EMBODIMENTS

Figure 1:
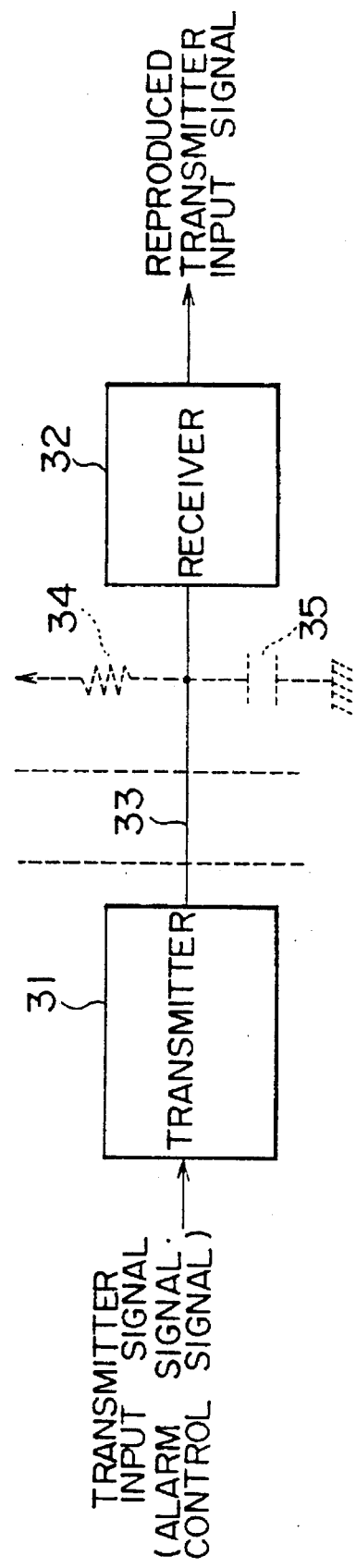
FIG. 1 is a block diagram showing a conventional signal transmission system.

FIG. 2 is a block diagram showing the principle and construction of the signal transmission system according to the present invention. Referring to FIG. 2, a transmitter 1 receives an input signal (transmitter input signal) and outputs a result (transmitter output signal) of operations applied to the transmitter input signal. A receiver 2 receives the transmitter output signal and outputs a result (reproduced transmitter input signal) of operations applied to the received transmitter output signal. The receiver 2 also receives the frame signal and the clock signal.

A description will be given, with reference to FIGS. 3-8, of a first embodiment of the present invention.

In a transmitter 51 according to the first embodiment of the present invention, a basic signal is generated on the basis of a clock signal and a frame signal, as shown in FIG. 3. More specifically, a basic signal obtained as a result of frequency division operation and having a cycle corresponding to two clock pulses is generated.

When a transmitter input signal as shown in FIG. 3 is fed to the transmitter 51, it is converted (reversed) so that a signal (a) is obtained. At logical reversal points (points at which the logical level of a signal is reversed, i.e. from high to low or from low to high) of the signal (a), the basic signal described above is reversed.

With this arrangement, when the transmitter input signal is logical "1", a logical pattern "01" occurs in the transmitter output signal, and, when the transmitter input signal is logical "0", a logical pattern "10" occurs in the transmitter output signal. It will be noted that a pulse "01" represents a biphase "1", and a pulse "10" represents a biphase "0". In other words, the transmitter input signal is subjected to phase modulation and transferred to a receiver 52 according to the first embodiment.

The receiver 52 receives the clock signal, the frame signal and the transmitter output signal, as indicated in FIG. 4.

The receiver 52 generates a mask signal having the same cycle as the basic signal in the transmitter 51, out of the received clock signal and the received frame signal. This mask signal is provided to mask one of two succeeding clock pulses.

The received transmitter output signal is delayed by one cycle of the received clock signal so as to obtain a signal (b). Logical reversal points in a biphase pulse stream of the signal (b) are detected so as to generate a signal (c). The signal (c) is modified in accordance with the received clock signal and the mask signal so that a signal (d), where every other clock pulse manifests itself, is obtained. The leading edge of the signal (d) and the received transmitter output signal are combined to obtain the transmitter input signal as input to the transmitter 51.

When a failure occurs in the transmission channel so that the transmitter output signal produced by the transmitter 51 is maintained at a same logical level, the received transmitter output signal in the receiver 52 is fixed to logical "1", as indicated by a broken line.

As a result of this, the signal (b) is maintained at logical "1", and the signal (c) is maintained at logical "0". Consequently, the signal (d) becomes logical "1" so that the previous logical level is maintained, while not affecting the reproduced transmitter input signal. In this way, the transmitter output signal detection error can be prevented.

Figure 5:
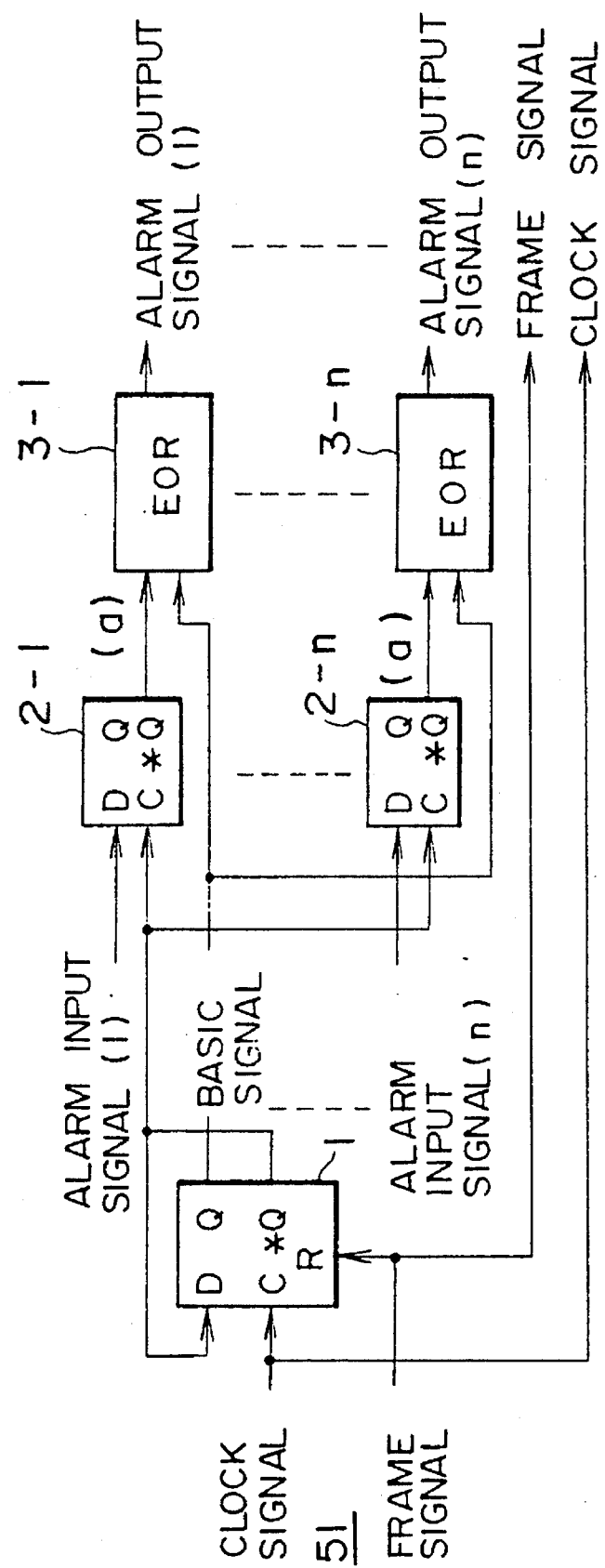
FIG. 5 is a circuit diagram showing an example of the transmitter of the signal transmission system according to the first embodiment.

As shown in FIG. 5, the transmitter 51 of the first embodiment includes: a D-type flip-flop (hereinafter, referred to as FF) 1 which receives the clock signal at the clock terminal C, receives the frame signal at the reset terminal R, and receives *Q (the value obtained by reversing the output Q) output at the data input terminal D; FF2-1-2-n which receive the *Q output of the FF1 at the clock terminal C and receive transmitter input signals (for example, alarm input signals input to the transmitter 51) (1)–(n) at the data input terminals D; and EOR (exclusive OR) gates 3-1-3-n which receives the *Q output of the FF2-1-2-n as one input and receives the Q output of the FF1 (basic signal) as the other input. Transmitter output signals (for example, alarm output signals) (1)–(n) are generated from the EOR gates 3-1-3-n. The clock signal and the frame signal are transmitted to the receiver 52 in an unmodified manner.

A description will now be given, with reference to FIG. 3, of the operation of the transmitter 51. Since the FF1 is provided with the frame signal as the reset signal, the basic signal having a cycle corresponding to two clock pulses is output as the Q output. The Q output is then supplied to the EOR gates 3-1-3-n as a common input.

The *Q output of the FF1 is supplied to the data input D of the FF1 itself and is also supplied to the clock input C of the FF2-1-2-n.

Since the transmitter input signals (alarm input signals) (1)–(n) are fed to the data input D of the FF2-1-2-n, they are "forwarded" at the rise of the clock signal so as to be output from the output terminal *Q of the FF2-1-2-n as signals (a).

The signals (a) are supplied to one input of the EOR gates 3-1–3-n.

It is assumed that one or more of the alarm input signals exhibit a transition from an alarm state to a non-alarm state, as shown in the waveform of FIG. 3. The signal (a) derived from the alarm input signal has an appearance of a result of delaying the alarm input signal by a half cycle of the basic signal, that is, by one full cycle of the clock signal, and then reversing the delayed signal.

Upon reception of the signals (a), the EOR gates 3-1–3-n detect disagreement between the basic signal and the signals (a) so that the alarm output signals (transmitter output signal) as shown in FIG. 3 are output.

It will be noted, from the waveform of the alarm output signal, that the logical patterns "01" occur until the signal (a) rises. The logical pattern "01" represents a biphase "0". The logical patterns "10" which occur afterward represents a biphase "1".

The logical "1" (alarm state) of the transmitter input signal (alarm state) is made to correspond to the biphase "1" associated with the logical pattern "01", and the logical "0" of the transmitter input signal (non-alarm state) is made to correspond to the biphase "0" associated with the logical pattern "10". The signal resulting from this phase modulation is then transmitted to the receiver 52.

Figure 6:
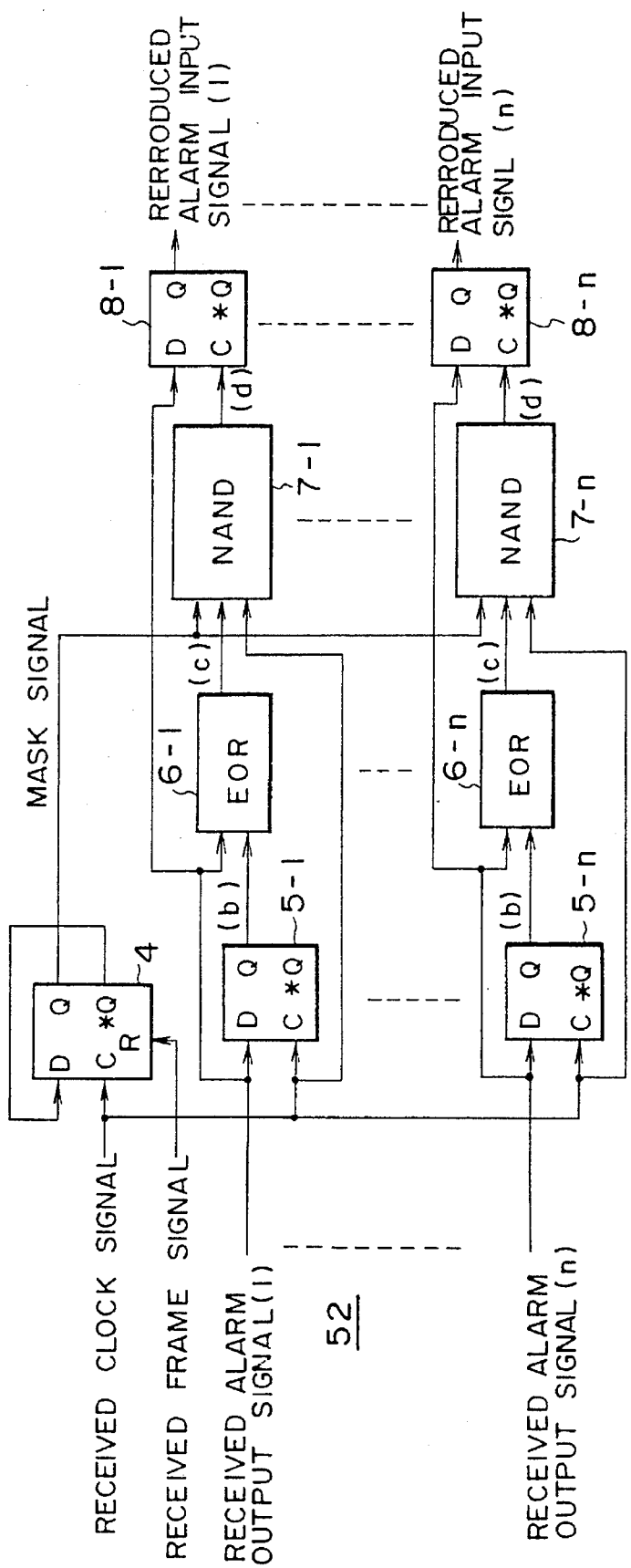
FIG. 6 is a circuit diagram showing an example of the receiver of the signal transmission system according to the first embodiment.

The receiver 52 of the first embodiment receives the clock signal, the frame signal and the transmitter output signals (alarm output signals) (1)–(n) from the transmitter 51. As shown in FIG. 6, the receiver 52 includes an FF4 which receives the received frame signal at the reset terminal R, receives the received clock signal at the clock terminal C, and outputs the mask signal from the output terminal Q; FF5-1–5-n which receive the received transmitter output signals (alarm output signals) (1)–(n) at the data input terminals D, and receive the received clock signal at the clock terminals C; EOR gates 6-1–6-n which receive the Q outputs of the FF5-1–5-n and the received transmitter output signals (alarm output signals) (1)–(n); NAND gates 7-1–7-n which receive the mask signal from the FF4, receive the output signals from the EOR gates 6-1–6-n, and receive the received clock signal; FF8-1–8-n which receive the output signals from the NAND gates 7-1–7-n at the clock terminals C, receive the received transmitter output signals (alarm output signals) (1)–(n) at the data input terminals D, and output the reproduced transmitter input signals (alarm input signals) (1)–(n) at the output terminals Q.

A description will now be given, with reference to FIG. 4, of the operation of the receiver 52. On the basis of the received frame signal, the FF4, like the FF1 of the transmitter 51, outputs, from the output terminal Q, the mask signal having the cycle identical to that of the basic signal of the transmitter 51. That is, the duration of the cycle of the mask signal is twice the cycle of the clock signal. As will be described later, the mask signal is a signal for masking (invalidating) every other clock pulse.

The received transmitter output signals (alarm output signals) (1)–(n) are delayed by one clock pulse in the FF5-1–5-n, respectively by means of the received clock signal, so that the signals (b) are obtained.

The signals (b) and the received transmitter output signals (alarm output signals) (1)–(n) are input to the EOR gates 6-1–6-n for detection of disagreement between these two signals, so that the signals (c) are obtained. The signals (c) become logical "0" only at a biphase logical reversal point of the received alarm output signal.

The signals (d) are obtained by feeding the NAND gates 7-1–7-n with the signals (c), the mask signal from the FF4, and the received clock signal. As shown in FIG. 4, the mask signal functions to mask (invalidate) every other clock pulse.

Accordingly, the FF8-1–8-n, which receive the signals (d) at the clock input and receive the received transmitter output signals (alarm output signals) (1)–(n) at the data input, reproduce the transmitter input signals (alarm input signals) (1)–(n) in which a transition from logical "1" to logical "0" takes place in correspondence to the logical reversal point of the received alarm output signal.

When the alarm output signal received from the transmitter 51 falls in an interrupt state so that the received alarm output signal is fixed to logical "1" as indicated by a broken line in FIG. 4, the signal (b) also stays at logical "1", the signal (c) stays at logical "0", and the signal (d) stays at logical "1".

Thus, when the supply of the clock signal is interrupted, the FF8-1–8-n function to maintain a state occurring prior to the interruption. This means that no disturbance or erroneous variation is introduced in the receiver output signal even when an error has occurred in the alarm signal (transmitted signal).

In a first variation of the first embodiment, the receiver may be equipped with a clock interrupt detection circuit for detecting an interruption of the received clock signal so that the reproduced transmitter input signal having the previous logical level maintained can be obtained, even when there is an interruption of the clock signal.

Figure 7:
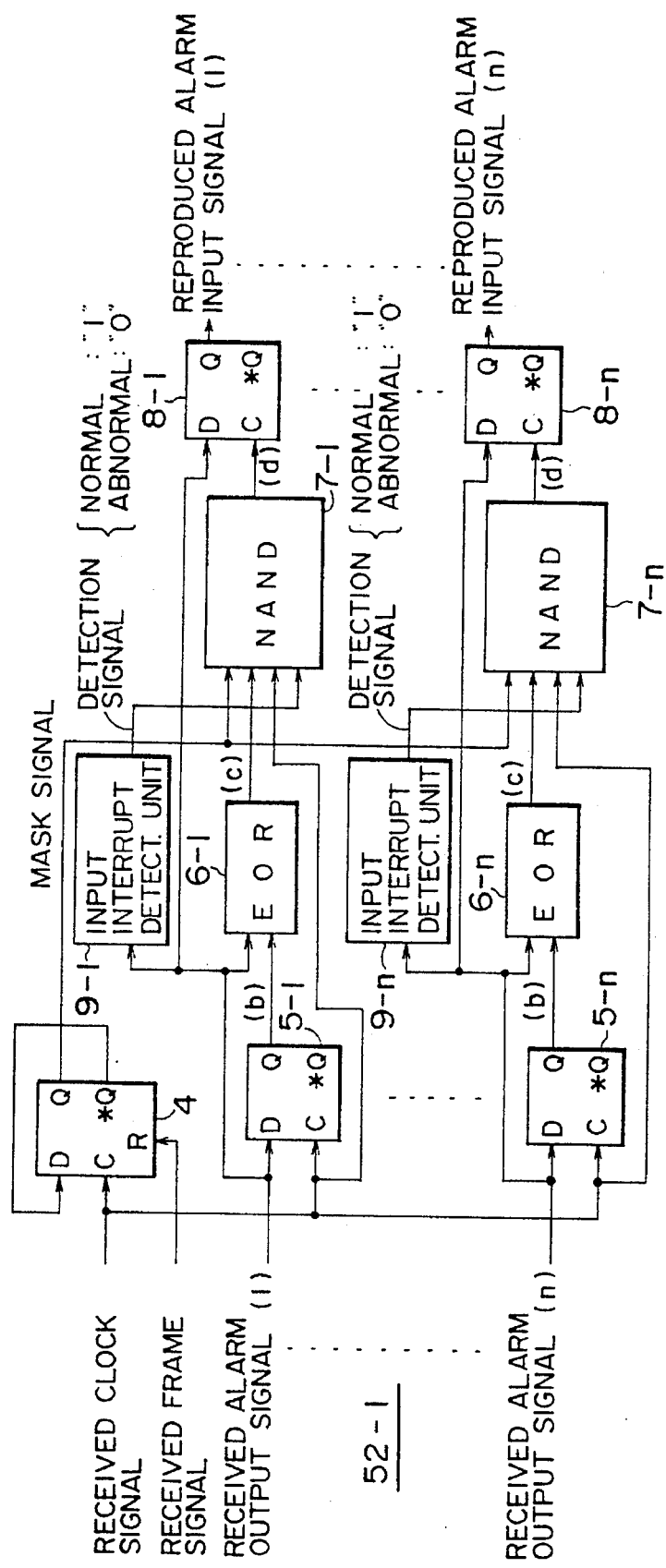
FIG. 7 is a circuit diagram showing a first variation of the receiver of the signal transmission system according to the first embodiment.

FIG. 7 shows a receiver 52-1 which realizes this first variation. This receiver differs from the receiver 52 shown in FIG. 6 in that there are added input interrupt detecting units 9-1–9-n which yield a determination that an input is interrupted when no change is observed for a duration of at least three clock pulses in the received transmitter output signals (alarm output signals) (1)–(n), and which supply detection signals corresponding to the determination, to the NAND gates 7-1–7-n, respectively.

The detection signals of the input interrupt detecting units 9-1–9-n is logical "1" in a normal state in which there is no interruption of the input, and becomes logical "0" in an abnormal state in which there is an interruption. The difference from the receiver 52 shown in FIG. 6 is that, when it is detected that no change has occurred for the duration of at least three clock pulses, the signals (d) shown in FIG. 4 are fixed to one of the two logical levels via the NAND gates 7-1–7-n. Hence, the receiver 52-1 of FIG. 7 can cope with an occurrence of a failure earlier than the receiver 52 of FIG. 6.

A second variation of the first embodiment is such that the receiver is equipped with an input interrupt detection circuit for detecting an occurrence of a logical level being maintained for the duration equal to three clock pulses so that the reproduced transmitter input signal having the previous logical level maintained can be obtained, even when there is an interrupt of the input.

Figure 8:
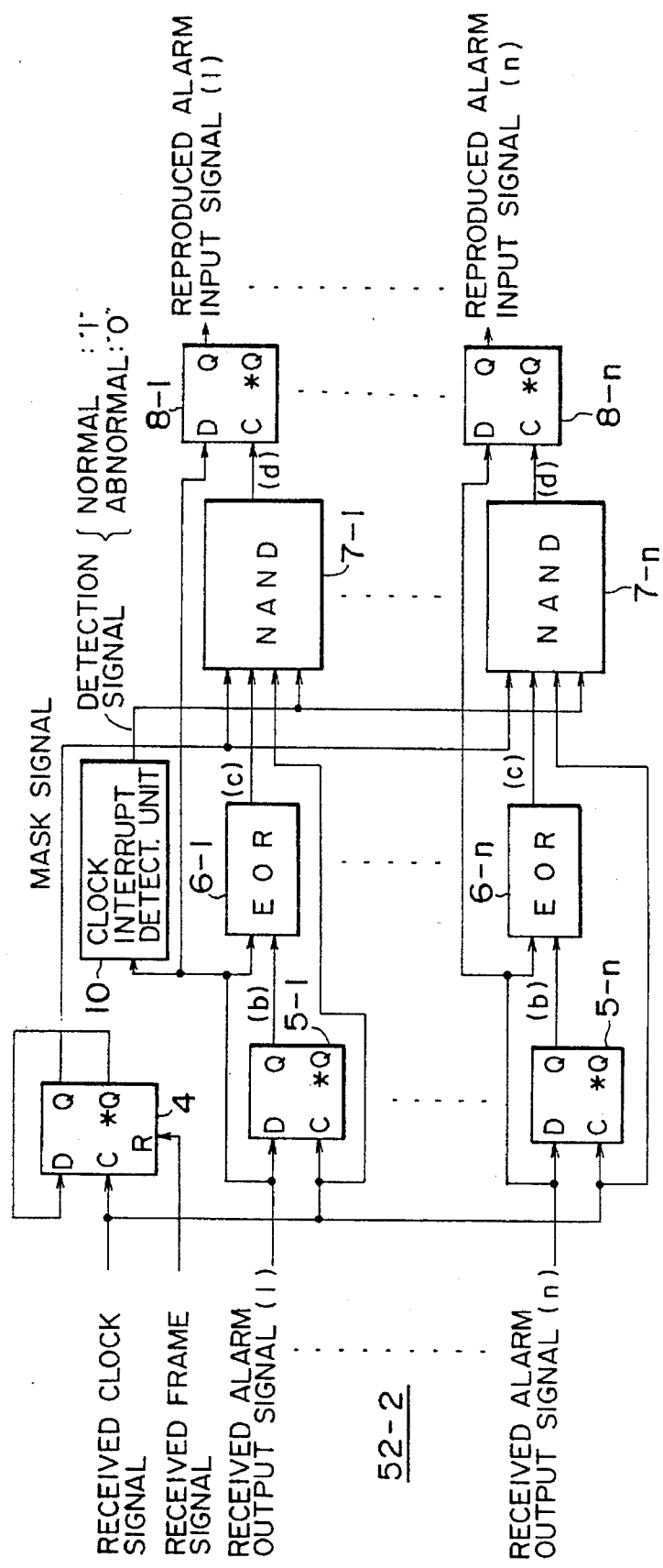
FIG. 8 is a circuit diagram showing a second variation of the receiver of the signal transmission system according to the first embodiment.

FIG. 8 shows such a receiver 52-2 which realizes this first variation. This receiver differs from the receiver 52 shown in FIG. 6 in that there is added a clock interrupt detecting unit 10 which receives as input the received clock signal and detects an interruption of the clock signal. The clock interrupt detecting unit 10 supplies the detection signal corresponding to the detection result to the NAND gates 7-1–7-n.

According to this second variation, when the clock signal sent from the transmitter 51 to the receiver 52-2 is interrupted, the clock interrupt detecting unit 10 detects the interruption and outputs the detection signal having a logical level "1" in a normal state and a logical level "0" in an abnormal state, to the NAND gates 7-1–7-n.

Accordingly, the FF8-1–8-n is capable of maintaining the previously occurring logical state when there is an interruption in the clock signal. Hence, an erroneous operation can be prevented in all the lines.

While an alarm signal is taken as an example in the first embodiment, the first embodiment may also be applied to a control signal. However, the first embodiment will be more suitably applied to the alarm signal than to the control signal in the sense that it functions to maintain the previously occurring logical state.

A description will now be given, with reference to FIGS. 9–12, of a second embodiment.

A transmitter 61 according to the second embodiment is adapted to the clock signal and the transmitter input signal as shown in FIG. 9.

The transmitter output signal output from the transmitter 61 is such that it includes a predetermined pattern, other than an all-zero pattern, in correspondence to the enable state ("1") of the transmitter input signal. This predetermined pattern is produced on the basis of the clock signal.

Thus, logical "1", that is, the enable state, of the transmitter input signal is represented by an occurrence of the logical pattern "10" in the transmitter output signal. The remaining portion of the transmitter output signal represents logical "0" of the transmitter input signal.

While, in the time chart of FIG. 9, a repetitive pattern having a cycle equal to two clock pulses and synchronized with the clock signal is employed as the predetermined pattern, any pattern other than an all-zero pattern is acceptable as long as the purpose of differentiating logical "1" from logical "0" of the transmitter input signal is served. Alternative patterns include a three-clock pattern "011" and a four-clock pattern "0110". On the other hand, logical "0" of the transmitter input signal must be represented by the all-zero pattern.

FIG. 10 shows a time chart of the signals received and produced in a receiver 62 according to the second embodiment. Referring to FIG. 10, the receiver 62 receives the clock signal and the transmitter output signal from the transmitter 61. An interval in the transmitter output signal during which interval the repetitive synchronized patterns occur is detected by the clock signal, resulting in a signal (b), which represents an enable interval of the received transmitter output signal. More specifically, the signal (b) is obtained such that the received transmitter output signal is delayed by a half cycle so that a signal (a) is obtained, and disagreement between the received transmitter output signal and the signal (a) is detected.

The number of clock pulses occurring in the enable interval of the signal (b), which interval corresponds to the synchronized patterns, is counted. In accordance with the count, a determination is made as to whether or not the transmitter input signal from the transmitter 61 is normal. For example, when a protection step of six pulses is set, the transmitter input signal is determined to be normal when the count has reached the threshold value of six.

In case the transmitter 61 is in an abnormal state, the count with respect to the signal (b) will not reach six, unlike the example shown in FIG. 10. Therefore, the transmitter input signal will not be reproduced.

Figure 11:
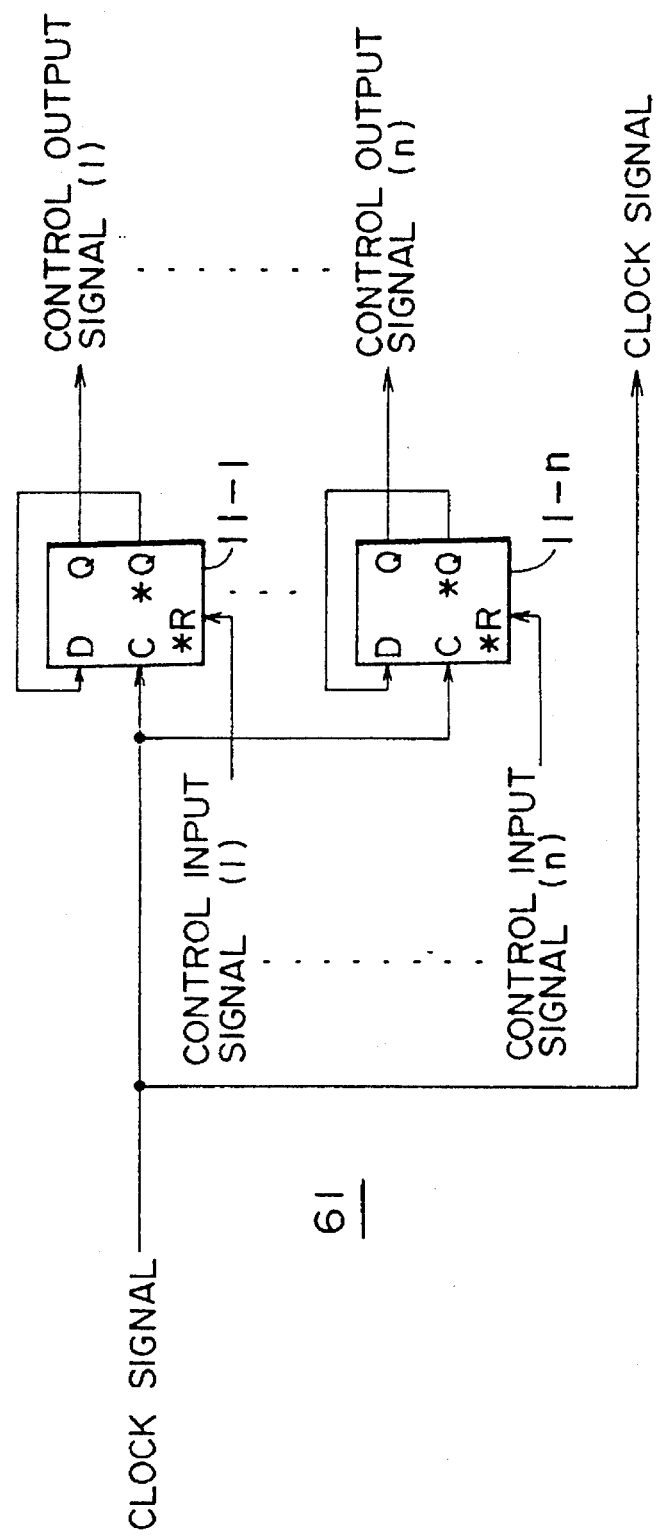
FIG. 11 is a time chart showing the operation of the transmitter of the signal transmission system according to a third embodiment.

As shown in FIG. 11, the transmitter 61 according to the second embodiment includes FF11-1-1-n which receive the clock signal at the input terminal C, receive transmitter input signals (for example, control input signals input to the transmitter 61) (1)–(n) at the reset terminal R, and output transmitter output signals (control output signals) (1)–(n) from the output terminal Q. The output terminal *Q and the data input terminal D of each of the FF11-1–11-n are connected to each other. The clock signal is transmitted to the receiver 62 in an unmodified manner.

A description will now be given, with reference to FIG. 11, of the operation of the transmitter 61 according to the second embodiment, the control signal being taken as an example of the transmitter input signal. The control input signals destined to the respective control targets are supplied to the FF11-1–11-n as shown in FIG. 11. In response to the clock signal, the FF11-1–11-n generate the control output signals (1)–(n) as shown in FIG. 11.

For example, in response to the transmitter input signal (control input signals) as shown in FIG. 9, three synchronized logical "01" patterns are generated in a successive manner. As has been noted before, the predetermined pattern such as this should not take the form of an all-zero pattern.

Figure 12:
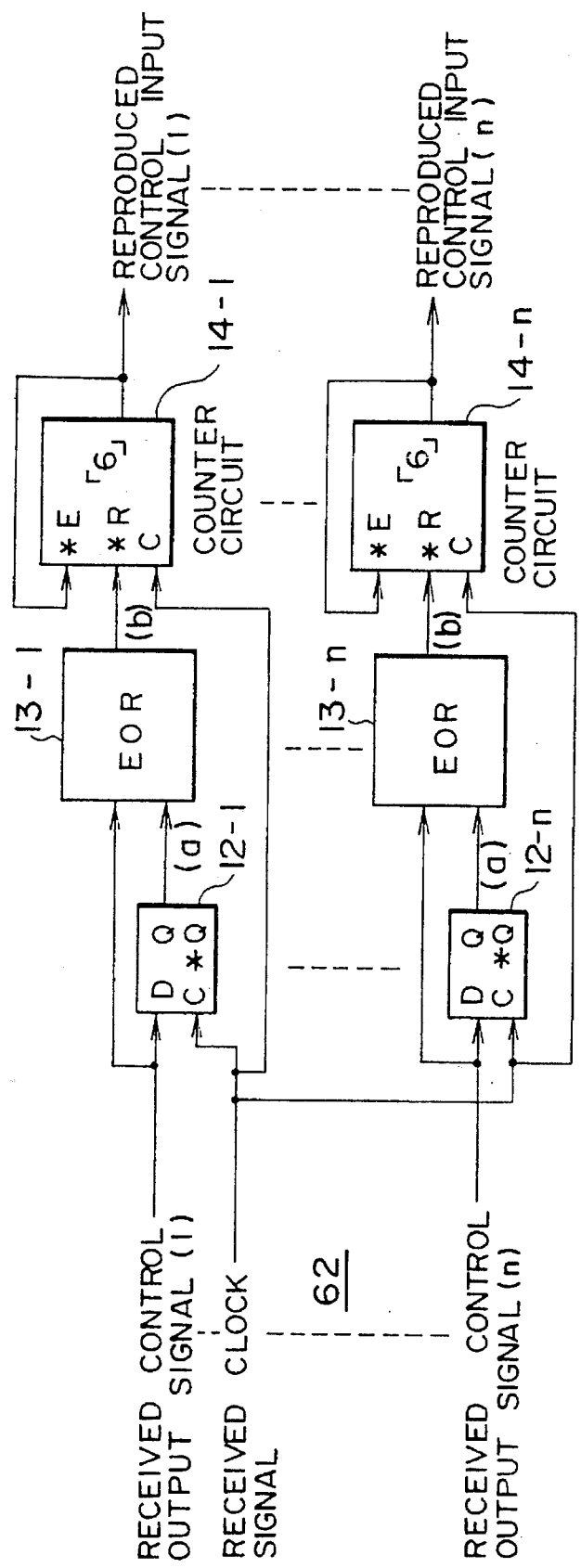
FIG. 12 is a time chart showing the operation of the receiver of the signal transmission system according to the third embodiment.

The receiver 62 according to the second embodiment receives the clock signal and the control output signals (1)–(n) from the transmitter 61. As shown in FIG. 12, the receiver 62 includes: FF12-1–12-n corresponding to the FF5-1–5-n of the receiver 62 shown in FIG. 6; EOR gates 13-1–13-n corresponding to the EOR gates 6-1–6-n; and counter circuits 14-1–14-n which receive, in accordance with the negative logic, output signals of the EOR gates 13-1–13-n as the reset input, which count received clock pulses, and which reset the counter to 0 when the count has reached six. The reproduced control input signals (1)–(n) are obtained as the outputs from the counter circuits 14-1–14-n.

The receiver 62 operates such that the received control output signals (1)–(n) are delayed by one clock pulse by means of the FF12-1–12-n so that the signals (a) are obtained.

The signals (a) and the control output signals (1)–(n) are fed to the EOR gates 13-1–13-n so that the signals (b) are obtained.

During the enable state of the signals (b), the counter circuits 14-1–14-n count the received clock pulses, and, when the count has reached the threshold value "six", which is preset in the counter circuits, the output signals from the counter circuits turn from logical "0" to logical "1". Consequently, the control input signals (1)–(n) are reproduced.

In the case in which an error occurs in the control output signals received by the receiver 62 according to the second embodiment, for example, when the control output signals are caused to stay logical "1", the signals (a) also stay logical "1". In consequence of this, the duration of the enable interval in the output signals (b) output from the EOR gates 13-1–13-n becomes shorter than the duration of the enable interval as shown in FIG. 10. Accordingly, the counter circuits 14-1–14-n cannot count up to the threshold value "six". Hence, the control input signals (1)–(n) are fixed to logical "0".

Therefore, even when a failure occurs while the control signal is sent as a transmitted signal, it is possible to prevent the control signal from assuming a logical "1" state erroneously so that an erroneous control operation can be prevented.

A description will now be given, with reference to FIGS. 13–15, of a third embodiment of the present invention.

A transmitter 71 according to the third embodiment differs from the transmitter 61 according to the second embodiment in that the transmitter input signal to which the third embodiment is adapted is synchronized to an integral multiple of the cycle of the clock signal, that is, the predetermined pattern appearing in the input signal has a duration which is an integral multiple of the cycle of the clock signal.

More specifically, the transmitter input signal as shown in FIG. 13 may be input to the transmitter 71. As indicated in FIG. 13, the transmitter input signal has a predetermined pattern, other than an all "0" pattern, having a duration which is, for example, an integral multiple of the two cycles of the clock signal. This means that no extra pulse, as shown in FIG. 9, that breaks an uniformity of the pattern occurs in the transmitter output signal. Instead, as shown in FIG. 13, the transmitter output signal that has a cycle equal to an integral multiple of two cycles of the clock signal is produced.

Accordingly, as shown in FIG. 14, the receiver 62, upon receipt of the clock signal and the transmitter output signal, counts clock pulses until the count reaches "six" while the signal (b) is in an enable state. When the count has reached "six" successfully, the receiver 62 determines that the transmitter 71 is in a normal state, and reproduces the transmitter input signal.

As in the second embodiment, the above mentioned count cannot not reach "six" if the transmitter 61 is in an abnormal state. In this case, the reproduced transmitter input signal as shown in FIG. 14 cannot be obtained. For example, when a failure has occurred during a period in which a control is performed, the reproduced transmitter input signal is fixed to logical "0" so that "1", which means that a control is enabled, will not occur erroneously.

A description will now be given of the construction of the transmitter 71, the control signal being taken as an example of the transmitter input signal.

Figure 15:
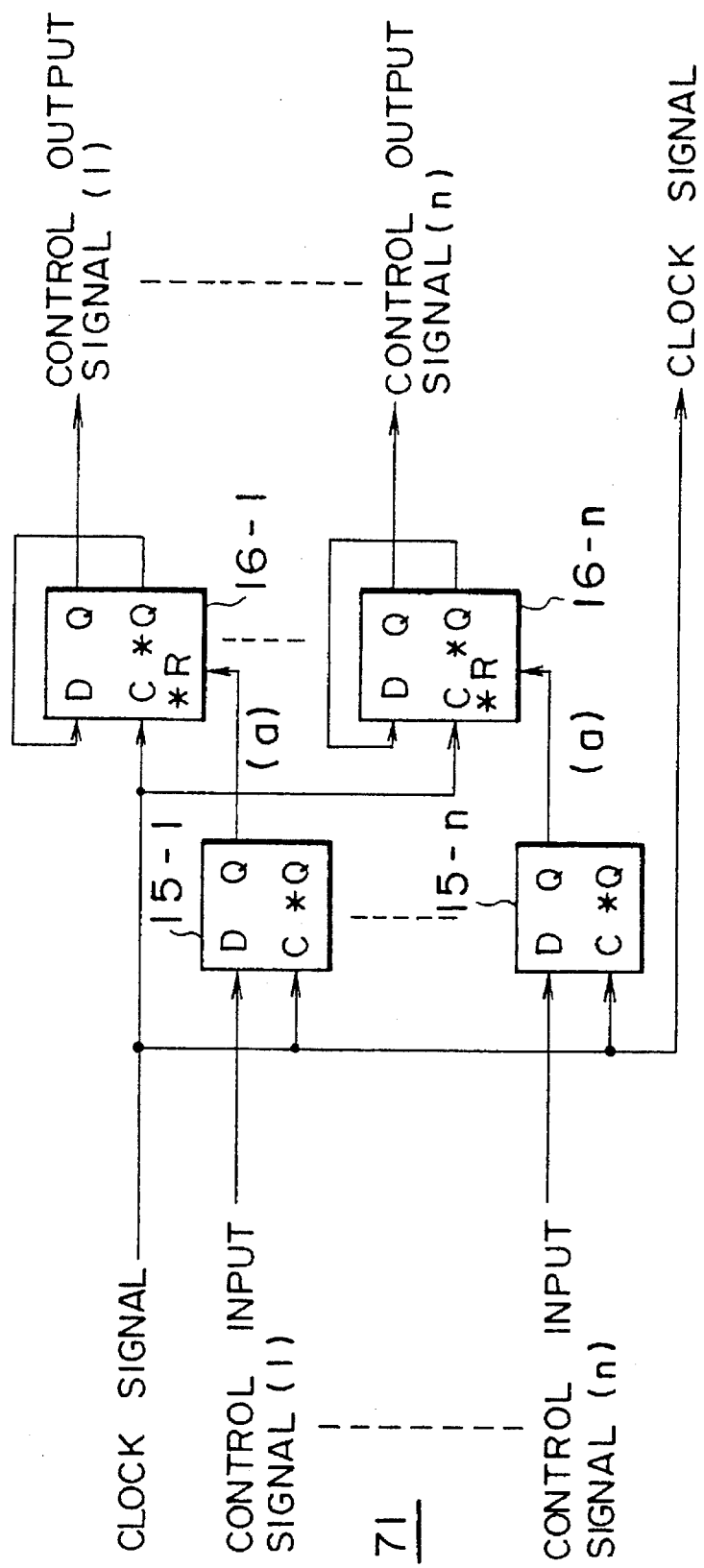
FIG. 15 is a circuit diagram showing an example of the receiver of the signal transmission system according to the second embodiment.

As shown in FIG. 15, the transmitter 71 includes: FF15-1–15-n which receive a common clock signal at the clock terminals C, and receive the control input signals (1)–(n) at the data input terminals D; and FF16-1–16-n which receive the output signals from the output terminals Q of the FF15-1–15-n at the reset terminals *R, receive the clock signal at the clock terminals C, and outputs the control output signals (1)–(n) from the output terminals Q, the output terminal *Q and the data input terminal D of each of the FF16-1–16-n being connected to each other. Like the embodiments described earlier, the clock signal is sent to the receiver 62 in an unmodified form.

A description will now be given, with reference to FIG. 13, of the operation of the transmitter 71. As shown in FIG. 13, the control input signals (1)–(n) have an enable interval having a duration of ten clock cycles. When these synchronized control input signals are applied to the FF15-1–15-n and struck by the clock signal, the signals (a) are obtained. The signals (a) are then applied to the FF16-1–16-n as negative logic reset signal inputs. The FF16-1–16-n output, from the output terminals Q, the control output signals (1)–(n) in the form of five biphase signal pulses which represent logical "1" and have double the cycle of the clock signal.

It will be noted that the receiver that receives these control output signals from the transmitter 71 can have the same construction as the receiver 62 of FIG. 12. Such a receiver is capable of reproducing the control input signals (1)–(n) as shown in FIG. 13.

Figure 16:
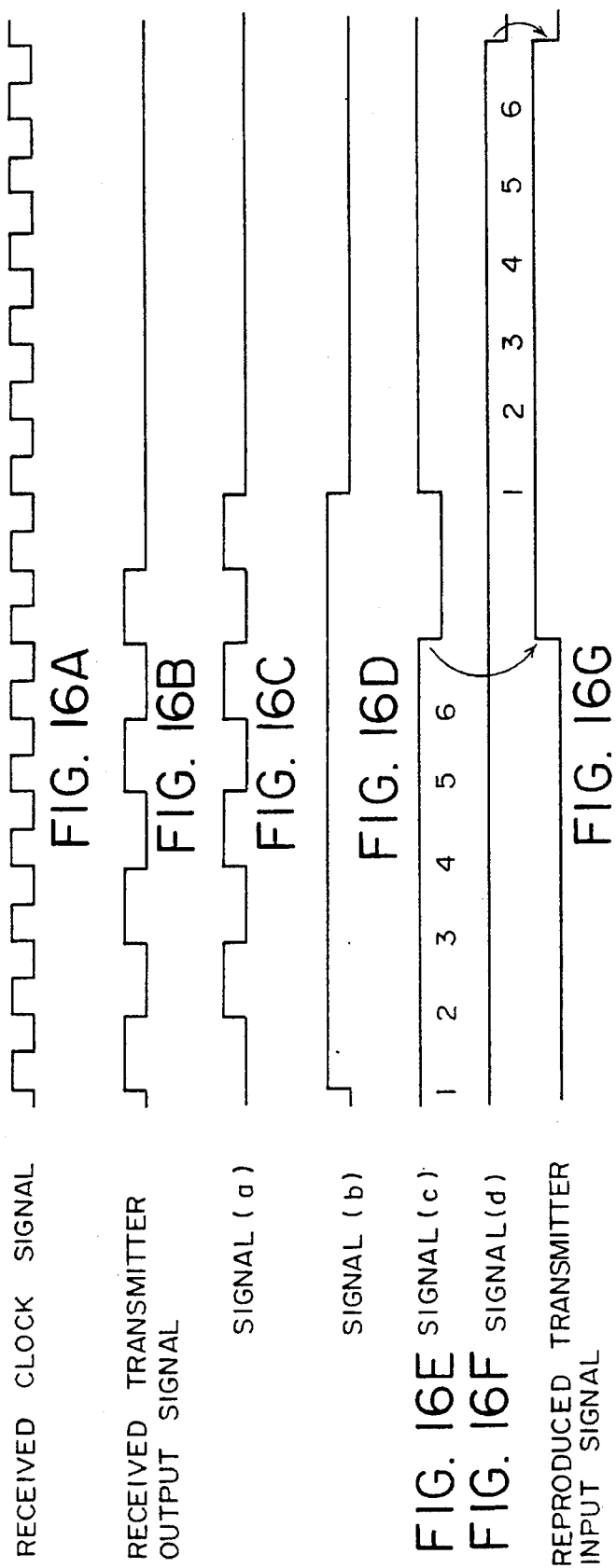
FIG. 16 is a circuit diagram showing an example of the transmitter of the signal transmission system according to the third embodiment.
Figure 17:
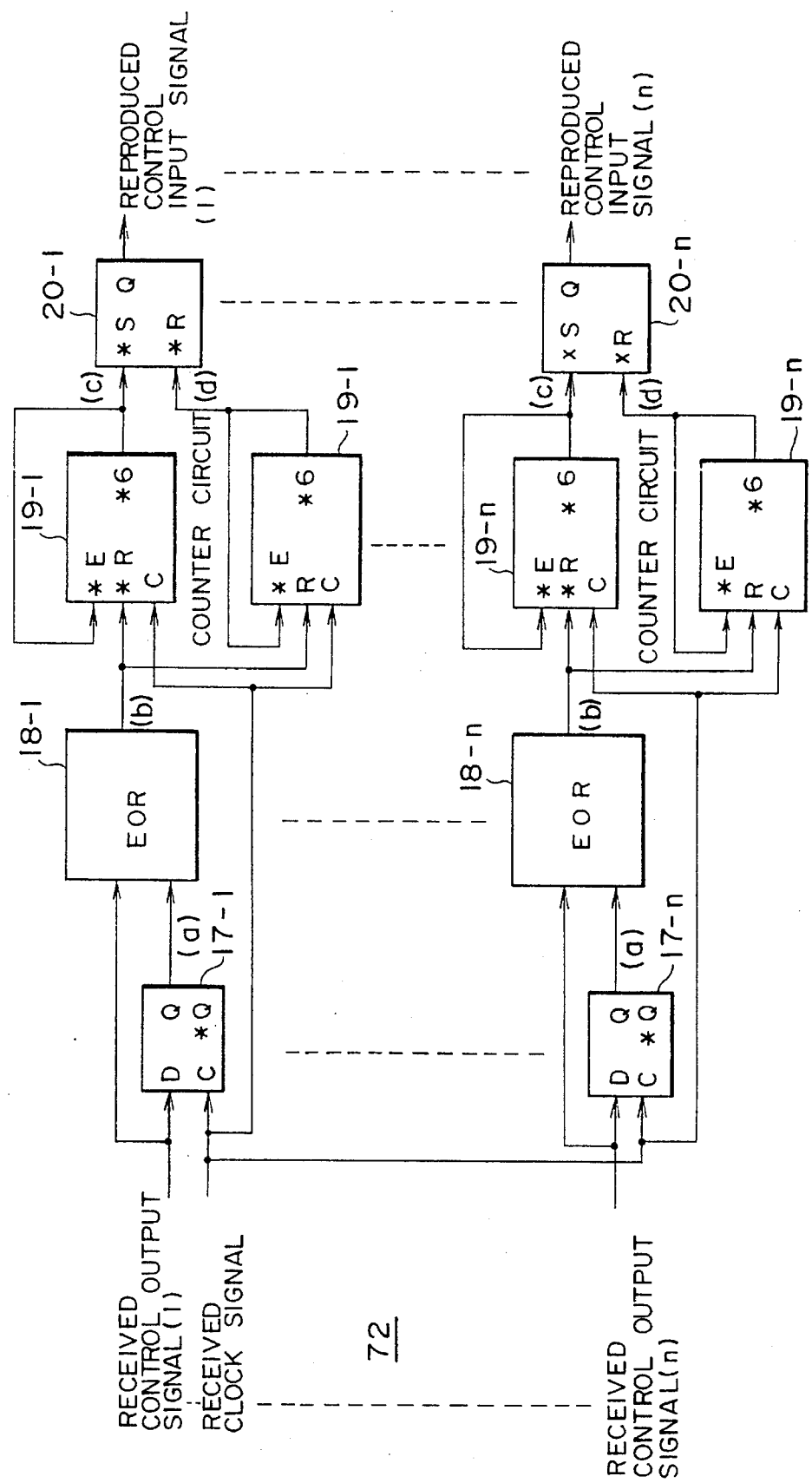
FIG. 17 is a circuit diagram showing an example of the receiver of the signal transmission system according to the fourth embodiment.

A description will now be given, with reference to FIGS. 16 and 17, of a fourth embodiment.

It will now be assumed that the transmitter input signal shown in FIG. 9 is supplied to a transmitter. In response to this, the receiver 62 produces, as shown in FIG. 16, a signal (b) similar to the signal (b) of FIG. 14. On the basis of the signal (b), a signal (c) and a signal (d) are produced. The signal (c) is obtained by counting clock pulses occurring during a period in which the signal (b) is logical "1", whereas the signal (d) is obtained by starting counting the clock pulses when the signal (b) becomes logical "0". Only when these counts exceed the threshold value that is an indication of a normal state of the transmitter, is the transmitter input signal reproduced. In this case, the reproduced transmitter input signal is returned from an enable state to a disable state when the count with respect to the signal (b) has reached "six".

A transmitter adapted to the fourth embodiment may be of the same construction as the transmitter 61 of FIG. 11. The control output signals (1)–(n) and the clock signal are transmitted from the transmitter 61 to a receiver 72 according to the fourth embodiment.

The receiver 72 includes: FF17-1–17-n which correspond to the FF12-1–12-n shown in FIG. 12, respectively; EOR gates which correspond to the EOR gates 13-1–13-n, respectively; counter circuits 19-1–19-n which correspond to the counter circuits 14-1–14-n; counter circuits 19-1'–19-n' which are provided parallel with the counter circuits 19-1–19-n, but which receive the output signals (b) output from the EOR gates 18-1–18-n, respectively, as positive logic inputs, unlike the counter circuits 19-1–19-n, the corresponding ones of the counter circuits 19-1–19-n and 19-1'–19-n' constituting pairs; and FF20-1–20-n each of which receives the signal (c) output from one of the corresponding pair as a negative logic input at the set input terminal *S, and receives the signal (d) output from the other counter circuit of the pair as a negative logic input at the reset input terminal *R. The FF20-1–20-n outputs the control input signals (1)–(n) from the output terminal Q.

A description will now be given, with reference to FIG. 16, of the operation of the receiver 72. It will be noted that the clock signal, the control input signal, the signal (a) and the signal (b) are similar to the corresponding signals shown in FIGS. 5 and 7, from signal to signal.

The signal (b) is supplied to both of the counter circuits constituting the pair. In one set of counter circuits 19-1–19-n, the number of clock pulses occurring in a logical "1" state (enable state) of the signal (b) is counted. As indicated by the signal (c) of FIG. 16, when the count has reached "six", the counter circuits 19-1–19-n reset the FF20-1–20-n, respectively.

On the other hand, in one set of counter circuits 19-1'–19-n', the counting is started when the signal (b) becomes logical "0" (disable state). As indicated by the signal (d) of FIG. 16, when the count has reached "six", the counter circuits 19-1'–19-n' reset the FF20-1–20-n, respectively.

Accordingly, the fourth embodiment functions such that the control input signals (1)–(n) are fixed to "0" when a failure occurs in control output signals, thereby ensuring that logical "1" of a control signal will not be output erroneously. Moreover, the three-step protection ensures that an erroneous occurrence of a pulse in a logical "0" position of the control output signal is determined as a failure, whereupon the logical "1" is maintained.

While the fourth embodiment is applicable to both an alarm signal and a control signal, it is more suitably applied to a control signal in that an erroneous control is prevented by fixing the control signal to a level.

The fourth embodiment may equally be applied to signals having their logical levels reversed.

In the second through fourth embodiments described above, the transmitter may be configured to produce a predetermined pattern other than an all-"1" pattern when the transmitter input signal is in a state other than an enable state (that is, in a disable state) so as to generate a transmitter output signal having a pattern other than a biphase logic pattern described in the first embodiment.

The present invention may also be applied to cases where the logical levels are reversed.

Thus, according to the present invention, it is possible to detect the state of the transmitter output signal sent from the transmitter, either when the positive logic is employed or the negative logic is employed.

It will be appreciated that the signal transmission system of the present invention is configured such that a transmitter therein is capable of converting a change in the logical level of an alarm signal or a control signal into a biphase signal or the like so that the receiver which receives the biphase signal or the like outputs a signal in which the previous level is maintained or only one of the logical levels occurs, thereby making it possible to prevent an erroneous occurrence of alarms or controls even when a failure occurs between the transmitter and the receiver.

What is claimed is:

1. A signal transmission system comprising:

a transmitter which receives a transmitter input signal, a clock signal and a frame signal and produces a basic signal on the basis of the clock signal and the frame signal, and produces a transmitter output signal having the format of a biphase logic signal that reflects a logical level change in a transmitter input signal, by reversing said basic signal in correspondence to logical reversal points of the transmitter input signal, the basic signal having a cycle of two clock pulses; and a receiver which receives said clock signal, said frame signal and said transmitter output signal from said transmitter, produces, on the basis of said clock signal and said frame signal, a mask signal that has same cycle as said basic signal and masks a first one of of two clock pulses, detects biphase logical reversal points of said transmitter output signal on the basis of said clock signal and said mask signal by delaying said transmitter output signal by one cycle of said clock signal, and reproduces said transmitter input signal in which a previous logical level is maintained even when said transmitter output signal is fixed at one logical value.

2. The signal transmission system as claimed in claim 1, wherein said receiver has a clock interrupt detecting circuit for detecting an interrupt of said clock signal received by the receiver, and said transmitter input signal in which a previous logical level is maintained is reproduced even when said clock signal is interrupted.

3. The signal transmission system as claimed in claim 1, wherein said receiver has an input interrupt detecting circuit for detecting that said transmitter output signal received by said receiver is maintained in a same logical state for a duration of at least three clock pulses, and said transmitter input signal in which a previous logical level is maintained is reproduced even when there is an interrupt in an input to the system.

4. A signal transmission system comprising:

a transmitter which receives a transmitter input signal and a clock signal and produces a transmitter output signal having a predetermined pattern other than an all-zero pattern on the basis of the clock signal, said transmitter output signal being produced only during an enable state of the transmitter input signal; and a receiver which receives said clock signal and said transmitter output signal from said transmitter, and includes means to detect an interval during which the predetermined pattern of said transmitter output signal occurs by means of said clock signal, means to count the number of clock signal pulses occurring in the interval, and means to reproduce said transmitter input signal when a counted number exceeds a threshold value that indicates a normal state of said transmitter so as to determine whether said transmitter is in the normal state.

5. The signal transmission system as claimed in claim 4, wherein said transmitter input signal is synchronized to an integral multiple of the cycle of the clock signal, so that, said predetermined pattern appearing in the transmitter input signal has a duration which is an integral multiple of the cycle of the clock signal.

6. A signal transmission system comprising:

a transmitter which receives a transmitter input signal and a clock signal and produces a transmitter output signal having a predetermined pattern other than an all-zero pattern on the basis of the clock signal, said transmitter output signal being produced only during an enable state of the transmitter input signal; and a receiver which receives said clock signal and said transmitter output signal from said transmitter, detects an interval during which the predetermined pattern of said transmitter output signal occurs by means of said clock signal, counts the number of clock pulses occurring in a logical "1" pattern as well as in a logical "0" pattern, and reproduces said transmitter input signal when a counted number exceeds a threshold value that indicates a normal state of said transmitter so as to determine whether said transmitter is in the normal state.

7. The signal transmission system as claimed in claim 4, wherein said transmitter produces a transmitter output signal having a predetermined pattern other than an all-"1" pattern in an interval when said transmitter input signal is not in an enable state.

8. The signal transmission system as claimed in claim 4, wherein logical values are reversed.

9. The signal transmission system as claimed in claim 1, wherein said transmitter input signal is an alarm signal or a control signal.

* * * * *